May 26, 1931.  S. F. MILLER  1,806,698
SLUDGE DIGESTION APPARATUS
Filed Aug. 2, 1929
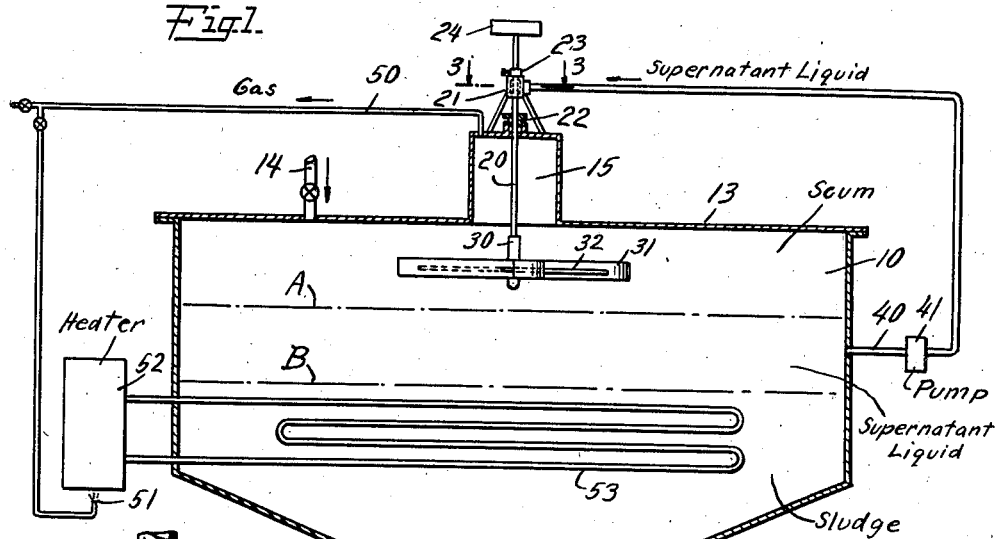
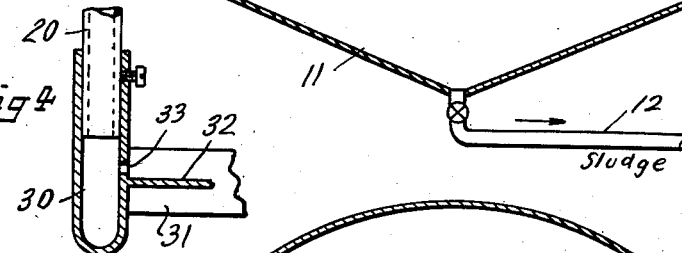
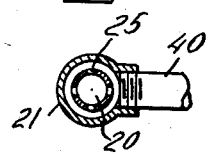
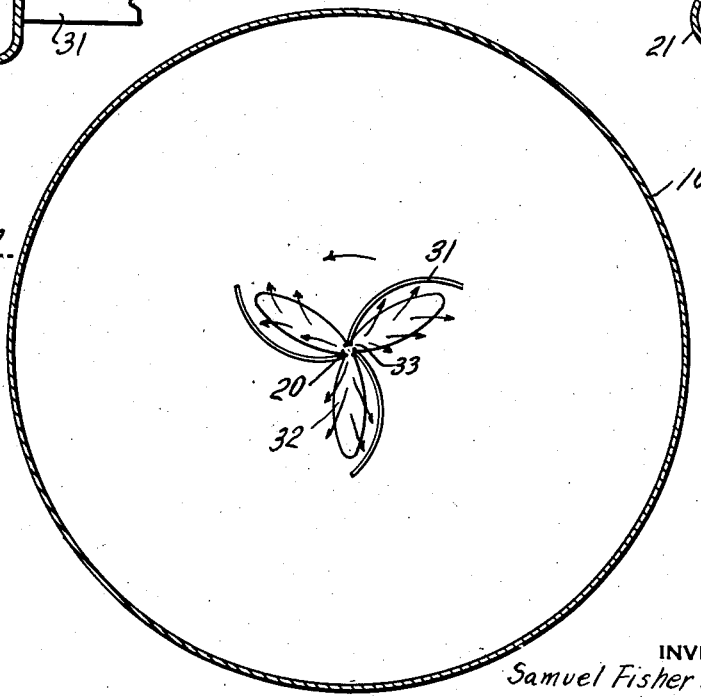
INVENTOR
Samuel Fisher Miller
BY
ATTORNEYS Patented May 26, 1931

1,806,698

UNITED STATES PATENT OFFICE

SAMUEL FISHER MILLER, OF BAY HEAD, NEW JERSEY, ASSIGNOR TO PACIFIC FLUSH-TANK COMPANY, OF NEW YORK, N. Y., A CORPORATION OF ILLINOIS

SLUDGE DIGESTION APPARATUS

Application filed August 2, 1929. Serial No. 382,940.

This invention relates to improvements in sludge digestion apparatus and its object is to provide a simple apparatus for increasing the efficiency of digestion tanks and for accelerating the action of digestion. It applies specifically to an arrangement for disintegrating the scum which forms in the upper part of such tanks and retards digestion. The fact that this scum arrests the flow of the gas is known and others have suggested different means for breaking up the scum which have to a certain extent improved the operation of the tanks. These have not, however, fully solved the problem, or proven to be entirely satisfactory. By the present invention, the sludge is thoroughly broken up to such an extent that the desired gas flow is not retarded and by the simple expedient which I will now proceed to describe, the digestion is accelerated, the operation facilitated, and a thicker sludge obtained.

In the drawings,

Fig. 1 is a more or less diagrammatic sectional elevation of a sludge digestion tank with my invention applied thereto;

Fig. 2 is a plan view of the same parts with the cover of the tank removed;

Fig. 3 is an enlarged sectional plan view of some of the parts, the section being taken on line 3—3 of Fig. 1; and Fig. 4 is an enlarged sectional elevation of some of the other parts.

10 designates a covered sludge digestion tank having a cone shaped base 11 to the base of which the sludge discharge pipe 12 is connected. 13 is the cover of the tank through which the sewage inlet 14 passes. 15 is a gas dome centrally located on the cover 13.

The parts thus described are of common and well known construction, the cover in this case being one of the fixed type but it is to be understood that the invention is applicable to all types of digestion tanks, including open tanks and tanks with floating covers. The horizontal broken lines A and B represent in a general way the positions of the materials within the tank. The latter is filled up to the cover, in the usual operation, with sewage which settles so that the sludge forms below the line B. Above the line B and below the line A is the supernatant liquid, and the scum which forms in the upper part of the tank is somewhere above the line A. The gas which forms during the digestion operation accumulates in the dome 15.

20 is a hollow rotary shaft which is mounted in a bearing member 21 on the top of the dome 15. This shaft passes through the stuffing box 22. 23 is a collar adjustably secured to the shaft 20 which determines the position of the shaft and the parts which are carried thereby. A pulley 24 is affixed to the upper end of the shaft by means of which the shaft may be rotated.

On the lower end of the shaft is a hollow hub member 30 from which project breaker blades 31 and distributor plates 32. Over each of the distributor plates is an orifice 33.

A pipe 40 is arranged to lead the supernatant liquid through a pump 41 and up to the bearing member 21 to which it is connected as shown in Fig. 3. The upper end of the shaft 20 is perforated as at 25 so that the supernatant liquid is discharged into the hollow shaft 20 through which it runs downwardly into the hub member 30.

50 is a gas pipe leading from the dome 15 to a burner 51 at the base of a heater 52. A heater coil 53 containing water or other liquid is located in the lower part of the digestion tank and connected to this heater 52.

Now when a digestion tank such as that shown and described is in use the gas generated during the operation rises from the sludge up through the supernatant liquid into the dome 15. The formation of scum above the supernatant liquid prevents a continuous flow of this gas, as I have pointed out, and for the purpose of overcoming this difficulty the arrangement which has just been described is provided. During the digestion operation the shaft 20 is rotated together with the parts which are carried by it, in the direction of the arrow shown in Fig. 3. The breaker blades 31 moving through the scum disintegrate it. At the same time the supernatant liquid is forced down through a hollow shaft 20 and discharged onto the top of the distributor plates 32 thus thoroughly impregnating and disintegrating the scum in proximity to this rotor. This gives a perfectly free passage for the gas rising from the material within the tank into the dome 15. The disintegrated scum becomes water-logged and sinks. The sludge thus formed is thicker than it would be if the material were not subjected to the action of this apparatus, because without it, gas bubbles adhere to the particles of sludge.

The gas which accumulates in the dome may be burned and the heat of combustion utilized to raise the temperature within the digestion tank to thereby accelerate the digestion operation.

By the use of this apparatus the scum formation is decreased. Digestion is aided by keeping the floating material submerged so that the liquid laden with bacteria can penetrate and act upon such material. Gas evolution which otherwise would be held under or in the scum is facilitated. This freer gas evolution speeds up digestion and breaking up the scum results in forming a thicker sludge from which the gas is eliminated.

I have shown the various parts diagrammatically because I realize that wide variations of form and structure can be made without departing from the spirit and scope of this invention, and I intend no limitations other than those which are imposed by the appended claims.

What I claim is:

1. In combination with a digestion tank, a rotary member submerged in the upper part of the tank, and means for discharging a liquid across said member into the tank.

2. In combination with a digestion tank, a submerged rotary member in the upper part of the tank comprising a plurality of distributor plates, and means for discharging liquid into the tank across said plates.

3. In combination with a digestion tank, a rotary member in the upper part of the tank comprising a plurality of distributor plates and a plurality of breaker blades, and means for discharging fluid into the tank over said plates.

4. In combination with a digestion tank, a hollow shaft projecting into the tank, a rotary member on the lower part of the shaft located in the upper part of the tank and means for circulating liquid from an intermediate portion of the tank through said shaft and rotary member into the upper part of the tank.

5. In combination with a digestion tank, a hollow shaft projecting into the tank, a rotary member on the lower part of the shaft located in the upper part of the tank, means for adjusting the vertical position of the member and means for circulating liquid from an intermediate portion of the tank through said shaft and rotary member into the upper part of the tank.

6. In combination with a digestion tank, a hollow shaft projecting into the tank, a rotary member on the lower part of the shaft located in the upper part of the tank, said member comprising a plurality of distributor plates and means for circulating liquid from an intermediate portion of the tank through said shaft and rotary member into the upper part of the tank.

7. In combination with a digestion tank, a hollow shaft projecting into the tank, a rotary member on the lower part of the shaft located in the upper part of the tank, said member comprising a plurality of substantially flat distributor plates and a plurality of curved breaker blades ahead of the distributor plates and means for circulating liquid from an intermediate portion of the tank through said shaft and rotary member over the distributor plates into the upper part of the tank.

8. In combination with a digestion tank, a hollow shaft projecting into the tank, a rotary member on the lower part of the shaft located in the upper part of the tank, said member comprising a plurality of distributor plates, means for circulating liquid from an intermediate portion of the tank through said shaft and rotary member into the upper part of the tank and means for adjusting the vertical position of the rotary member.

9. In combination with a digestion tank, a hollow shaft projecting into the tank, a rotary member on the lower part of the shaft located in the upper part of the tank, said member comprising a plurality of substantially flat distributor plates and a plurality of curved breaker blades ahead of the distributor plates, means for circulating liquid from an intermediate portion of the tank through said shaft and rotary member over the distributor plates into the upper part of the tank and means for adjusting the vertical position of the rotary member.

SAMUEL FISHER MILLER.